(12) United States Patent
Sakamoto et al.

(10) Patent No.: US 8,786,804 B2
(45) Date of Patent: Jul. 22, 2014

(54) SURFACE LIGHT SOURCE DEVICE AND LCD UNIT

(75) Inventors: Norihiro Sakamoto, Tokyo (JP); Atsushi Omori, Tokyo (JP); Tsuneo Sekiguchi, Tokyo (JP); Yoji Oki, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 31 days.

(21) Appl. No.: 13/284,859

(22) Filed: Oct. 28, 2011

(65) Prior Publication Data
US 2012/0162576 A1 Jun. 28, 2012

(30) Foreign Application Priority Data
Oct. 28, 2010 (JP) ................. 2010-242565

(51) Int. Cl.
*G02F 1/1335* (2006.01)
(52) U.S. Cl.
USPC .................. 349/65; 362/619; 362/620
(58) Field of Classification Search
None
See application file for complete search history.

(56) References Cited

U.S. PATENT DOCUMENTS

| | | | |
|---|---|---|---|
| 5,984,497 A | 11/1999 | Foerstner et al. | |
| 7,165,874 B2 * | 1/2007 | Nagakubo et al. | 362/623 |
| 7,614,777 B2 * | 11/2009 | Koganezawa et al. | 362/620 |
| 7,976,203 B2 | 7/2011 | Okada | |
| 2004/0076396 A1 * | 4/2004 | Suga | 349/65 |
| 2004/0239832 A1 * | 12/2004 | Saito | 349/74 |
| 2006/0210726 A1 * | 9/2006 | Jones et al. | 428/1.1 |
| 2008/0074583 A1 * | 3/2008 | Li et al. | 349/71 |
| 2009/0135623 A1 * | 5/2009 | Kunimochi | 362/608 |
| 2009/0167641 A1 * | 7/2009 | Kim et al. | 345/60 |
| 2009/0207629 A1 | 8/2009 | Fujiyama et al. | |
| 2010/0134720 A1 * | 6/2010 | Choi et al. | 349/64 |
| 2010/0253881 A1 * | 10/2010 | Han et al. | 349/65 |
| 2010/0328362 A1 * | 12/2010 | Song | 345/690 |
| 2011/0148941 A1 * | 6/2011 | Kim et al. | 345/690 |
| 2011/0234938 A1 * | 9/2011 | Jeong | 349/62 |

FOREIGN PATENT DOCUMENTS

| | | |
|---|---|---|
| JP | 2000-123610 A | 4/2000 |
| JP | 3181145 B2 | 7/2001 |
| JP | 2009-193892 A | 8/2009 |
| JP | 2010-97909 A | 4/2010 |

OTHER PUBLICATIONS

List of Potentially Related Pending Applications citing U.S. Appl. No. 13/358,500 to Yoshihiro Sasaki et al. filed Jan. 25, 2012 and U.S. Appl. No. 13/471,678 to Teruhiko Mihara et al. filed May 15, 2012.

* cited by examiner

*Primary Examiner* — Bumsuk Won
*Assistant Examiner* — Ryan Crockett
(74) *Attorney, Agent, or Firm* — Kenealy Vaidya LLP

(57) ABSTRACT

A surface light source device having a local dimming function and an LCD unit using the device can include a light guide having a top surface including a plurality of linear convexes and a bottom surface including a plurality of dots. The device can also include a reflective sheet located adjacent the bottom surface, a prism sheet located adjacent the top surface, a diffusing sheet located adjacent the prism sheet, and a pair of LED light sources located adjacent both light incident surfaces of the light guide and divided into a plurality of groups. Each light emitted from the groups can be configured to be emitted independently from a respective one of local domains on a light-emitting surface of the device. Therefore, the disclosed subject matter can provide a surface light source device having a local dimming function with a simple structure as with a conventional edge light type device.

14 Claims, 16 Drawing Sheets

Light incident surface

SURFACE LIGHT SOURCE DEVICE AND LCD UNIT

This application claims the priority benefit under 35 U.S.C. §119 of Japanese Patent Application No. 2010-242565 filed on Oct. 28, 2010, which is hereby incorporated in its entirety by reference.

BACKGROUND

1. Field

The presently disclosed subject matter relates to a surface light source device and an LCD unit including the same, and more particularly to a surface light source device of an edge light type having a local dimming function. Thus, the surface light source device can be employed as a light source for a back light unit located adjacent a liquid crystal display (LCD) for a television, a personal computer, mobile device, and the like, in which a light intensity of the surface light source device can vary in each local domain of light-emitting surfaces so as to match to respective regions of the LCD.

2. Description of the Related Art

Both a direct light type and an edge light type of surface light source device (when classified by location of light sources used for the surface light source devices) are known to be generally provided as surface light source devices used for a back light unit of an LCD and the like. The surface light source device of the direct light type is composed of a diffusing member, which is located rearward of an LCD, and a light source such as a plurality of light emitting diodes (LED), which is located rearward of the diffusing member so as to emit a diffusing light from the light source as a surface light source via the diffusing member. Accordingly, the direct light type device may illuminate the LCD with high brightness by increasing a light intensity of the light source, for example, by increasing the number of the LEDs.

In this case, for purpose of reducing power consumption of the light source and improving a visual quality such as a contrast of the LCD, the direct light type may provide a local dimming function, in which a light-emitting surface of the surface light source is divided into a plurality of local domains and each light intensity of the local domains is controlled by controlling the light intensity of each of the parts of the light source corresponding to each of the local domains.

When the direct light type employs a plurality of LEDs as the light source, the local dimming function may be easy to be structured by controlling each of the light intensities of the parts of the LEDs corresponding to each of the local domains. However, because a number of LEDs is required to structure the local dimming function in the surface light source device of the direct light type, the surface light source may become a high-cost device. In addition, it may be difficult for the direct light type device to allow the surface light source device to be made thinner because the direct light type needs any level of space between the LCD and the LEDs.

On the other hand, the edge light type is composed of a light guide plate, which is located rearward of an LCD, and at least one light source, which is located at least one edge of the light guide plate so as to emit light from one surface of the light guide plate toward the LCD. Thus, because an LCD unit using an edge light type device is thinner as compared to an LCD unit using the direct light type, various surface light source devices of the edge light type having a local dimming function have been devised.

For example, a first conventional surface light source device having a local dimming function is disclosed in Patent Document No. 1 (Japanese Patent Application Laid Open 2010-97909). FIG. 15a is a schematic top view depicting a basic structure for the first conventional surface light source device, which is disclosed in Patent Document No. 1, and FIG. 15b is a cross-sectional view of the basic structure of FIG. 15a taken along line A-A.

The first conventional surface light source device includes a light guide 31 including a plurality of light guide plates 31(1, 1), 31(2, 1) . . . 31(5, 1), 31(1, 2) . . . 31(1, 6) . . . 31(5, 6) arranged in a matrix as shown in FIG. 15a. Each thickness of a first light guide plate 31(1, 1) . . . 31(5, 1) arranged in rows is thinner than that of a second light guide plate 31 (1, 2) . . . 31(5, 2), which is located adjacent the first light guide plate, and the second light guide plate is arranged in a thinner shape than a thickness of a third light guide plate 31(1, 3) . . . 31(5, 3), which is located adjacent the second light guide plates as shown in FIG. 15b.

Each thickness of the third light guide plate and a fourth light guide plate 31(1, 4) . . . 31(5, 4) located adjacent the third light guide plate is substantially the same, and the thickness of the fourth light guide plate is thicker than that of a fifth light guide plate 31(1, 5) . . . 31(5, 5), which is formed in the same thickness as the second light guide plate. Additionally, the fifth light guide plate is arranged in a thicker shape than a thickness of a sixth light guide plate 31(1, 6) . . . 31(5, 6), which is formed in the same thickness as the first light guide plate.

The first conventional surface light source device also includes a plurality of linear LED light sources 30a to 30f, and each of the linear LED light sources 30a to 30f is located at a respective one of the edges of the first light guide plate to the six light guide plate. Therefore, by controlling each light intensity of LEDs located adjacent each edge of the light guide plates 31(1, 1) to 31(5, 6) in the linear LED light sources 30a to 30f facing the respective one of the edges of the first light guide plate to the six light guide plate, the first conventional surface light source device may provide a local dimming function on each light-emitting surface of the light guide plates 31(1, 1) to 31(5, 6).

However, the first conventional device having the local dimming function may become obviously thicker in thickness as compared to a conventional edge light type, and also may be relatively more complex in structure. In addition, the number of the linear LED light source may increase as compared to a conventional edge light type. That is because the light guide 31 needs to be arranged in matrix while the first to the sixth light guide plates having a different thickness are arranged in rows, and because each of the plurality of linear LED light sources needs to be located so as to face the respective one of the edges of the light guide plates arranged in matrix.

A second conventional surface light source device having a local dimming function, in which a plurality of linear LED light sources is aligned with edges of light guides, is disclosed in Patent Document No. 2 (Japanese Patent Application Laid Open 2009-193892). FIG. 16 is a schematic cross-sectional view depicting a basic structure for the second conventional surface light source device, which is disclosed in Patent Document No. 2.

The second conventional surface light source device includes: a casing 44; a first light guide 41 including a first edge surface, a second edge surface 43a, a third edge surface 43b and a fourth edge surface 43c, and being provided in the casing 44 so as to expose a light-emitting surface (a top surface of the first light guide 41) thereof from the casing 44; and a plurality of linear LED light sources having a first, a second, a third and a fourth LED light sources 40a to 40d, the first LED light source 40a located between the first edge surface of the first light guide 41 and the casing 44, the second LED light source 40b located between the second edge surface 43a of the first light guide 41 and the casing 44 via a second light guide 42a, the third LED light source 40c located between the third edge surface 43b of the first light guide 41 and the casing 44 via a third light guide 42b, and the fourth LED light source 40d located between the fourth edge surface 43c of the first light guide 41 and the casing 44 via a fourth light guide 42c.

In this case, each light emitted from the first light source 40a to the fourth light source 40d may enter into the first light guide 41 directly from the first edge surface or indirectly from a respective one of the second, the third and the fourth edge surfaces 43a-43c of the first light guide 41 via a respective one of the second, the third and the fourth light guides 42a to 42c. Additionally, each light intensity of the light emitted from the first light source 40a to the fourth light source 40d may be controlled by changing a driving current for each of the LED light sources 40a to 40d Therefore, the second conventional surface light source device may provide a local dimming function on each local domain of the light-emitting surface, which is divided between the first edge surface and the second edge surface, between the second edge surface and the third edge surface, between the third edge surface and the fourth edge surface and between the fourth edge surface and another edge surface opposite the first edge surface of the light guide, by controlling each light intensity of the LED light sources 40a to 40d facing the respective one of the first edge surface to the fourth edge surface of the first light guide 41.

However, although a structure of the second conventional surface light source device may be deferent from that of the first conventional surface light source device, principles of the first conventional and the second conventional devices may be basically similar, especially with respect to a light guide having different thicknesses and a plurality of light incident edge surfaces and a plurality of linear LED light sources corresponding to the light incident edge surfaces.

Thus, the second conventional surface light source having a local dimming function may also include the technical propositions, which are similar to these of the first conventional surface light source set forth above, such as the device may become thicker and may become more complex in structure as compared to a conventional surface light source of the edge light type.

The above-referenced Patent Documents are listed below and are hereby incorporated with their English abstract in their entireties.
1. Patent Document No. 1: Japanese Patent Application Laid Open JP2010-97909
2. Patent Document No. 2: Japanese Patent Application Laid Open JP2009-193892

The disclosed subject matter has been devised to consider the above and other problems and characteristics. Thus, embodiments of the disclosed subject matter can include a surface light source device of an edge light type having a local dimming function with a simple structure. In addition, the surface light source device can be as thin as the conventional device without a local dimming function while it provides a favorable light distribution. The disclosed subject matter can also include an LCD unit using the surface light source device as described above. The LCD unit can be configured to improve the visual quality of the display and to reduce power consumption.

SUMMARY

The presently disclosed subject matter has been devised in view of the above described and other problems and characteristics in the conventional art, and to make certain changes to the existing structures of conventional surface light sources. An aspect of the disclosed subject matter includes providing a surface light source device of an edge light type having a local dimming function with a simple structure. Furthermore, according to the disclosed embodiments, the surface light source device can maintain a thin profile in common with a conventional surface light source device of the edge light type. Thus, the surface light source device of the disclosed subject matter can be employed as a light source for a back light unit located at the rear of an LCD panel of a television, a personal computer, computer monitor, mobile device, etc.

Another aspect of the disclosed subject matter includes providing an LCD unit using the above-described surface light source device that can improve the visual quality of the display and can reduce power consumption. In addition, because the LCD unit can be formed with a substantially thin profile, it can be employed as a display unit for a personal computer, monitor, mobile device, etc.

According to an aspect of the disclosed subject matter, a surface light source device can include a light guide formed in a substantially tabular shape, a top surface and a bottom surface of the light guide formed in a substantially rectangular shape and being substantially perpendicular to a pair of light incident surfaces located on opposite surfaces with respect to each other, the top surface including a plurality of linear convexes that extend in a direction substantially perpendicular to the light incident surfaces and are aligned substantially parallel to the light incident surfaces, each of the linear convexes formed in a substantially triangular cross-sectional shape in an aligned direction of the linear convexes, the bottom surface including a plurality of dots that are formed in at least one of a minim convex shape and a minim concave shape.

In addition, the surface light source device can include: a pair of linear LED light sources including a plurality of LEDs in each longitudinal direction of the linear LED light sources, each of the linear light sources located adjacent a respective one of the pair of light incident surfaces of the light guide so as to face the respective one of the light incident surfaces, the plurality of LEDs included in each of the linear LED light sources divided into a plurality of groups, and each of the groups included in each of the linear LED light sources emitting light into the light guide independently with respect to each other; a reflective sheet located adjacent the bottom surface of the light guide; a prism sheet located adjacent the top surface of the light guide, a top surface of the prism sheet including a plurality of triangular prisms in a manner similar to the linear convexes of the light guide; and a diffusing sheet located adjacent the top surface of the prism sheet.

In the exemplary surface light source device, each of the groups included in one of the linear LED light sources can face a respective one of the groups included in another of the linear LED light sources with respect to each other via the light guide. The at least one of the minim convex shape and the minim concave shape included in the bottom surface of the light guide can be formed in a substantially triangle truncated cone having a direction of a normal vector of a slant surface, wherein the direction of the normal vector of the slant surface is located in a direction substantially perpendicular to one of the light incident surfaces that is closer to the slant surface of the at least one of the minim convex shape and the minim concave shape.

Additionally, the number of LEDs included in each of the groups of the linear LED light sources can reduce from each of both end groups of the linear LED light sources toward a group located at a central portion of a respect one of the linear LED light sources including the both end groups. The surface light source device can further include an LED driving circuit configured to control each of light intensities of lights emitted from the groups included in the linear LED light sources.

According to the above-described exemplary embodiments, each light emitted from the groups included in each of the linear LED light sources can be emitted from a respective one of local domains on the top surface of the diffusing sheet adjacent each of the groups on a respective one of substantially half regions of the top surface of the diffusing sheet that are located adjacent each of the linear LED light sources by using the above-described structure. Additionally, each light emitted from the groups can be emitted independently with respect to each other so as to be viewable at wider angles, and each of overlap light-emitting areas in adjacent local domains can reduce. Thus, the disclosed subject matter can provide surface light source devices of an edge light type having a local dimming function with a simple structure, which can provide a favorable light distribution.

Another aspect of the disclosed subject matter includes an LCD unit including the above-described surface light source device that can include: an LCD located adjacent the top surface of the diffusing sheet; an LCD driving circuit configured to drive the LCD; and an controller configured to control the LCD driving circuit, wherein at least one of the LCD driving circuit and the controller is configured to provide the LED driving circuit with a signal to control each light intensity of lights emitted from the groups included in the linear LED light sources.

According to the above-described exemplary LCD unit, the surface light source device having a local dimming function can be controlled in accordance with signals output from the LCD unit while the device is associated with a display content of the LCD. Thus, the disclosed subject matter can provide an LCD unit using the above-described surface light source device that can improve the visual quality of the display and can reduce power consumption.

BRIEF DESCRIPTION OF THE DRAWINGS

These and other characteristics, features and advantages of the disclosed subject matter will become clear from the following description with reference to the accompanying drawings, wherein:

FIG. 15b is a cross-sectional view of the basic structure of FIG. 15a taken along line A-A of FIG. 15a.

DETAILED DESCRIPTION OF EXEMPLARY EMBODIMENTS

Figure 1:
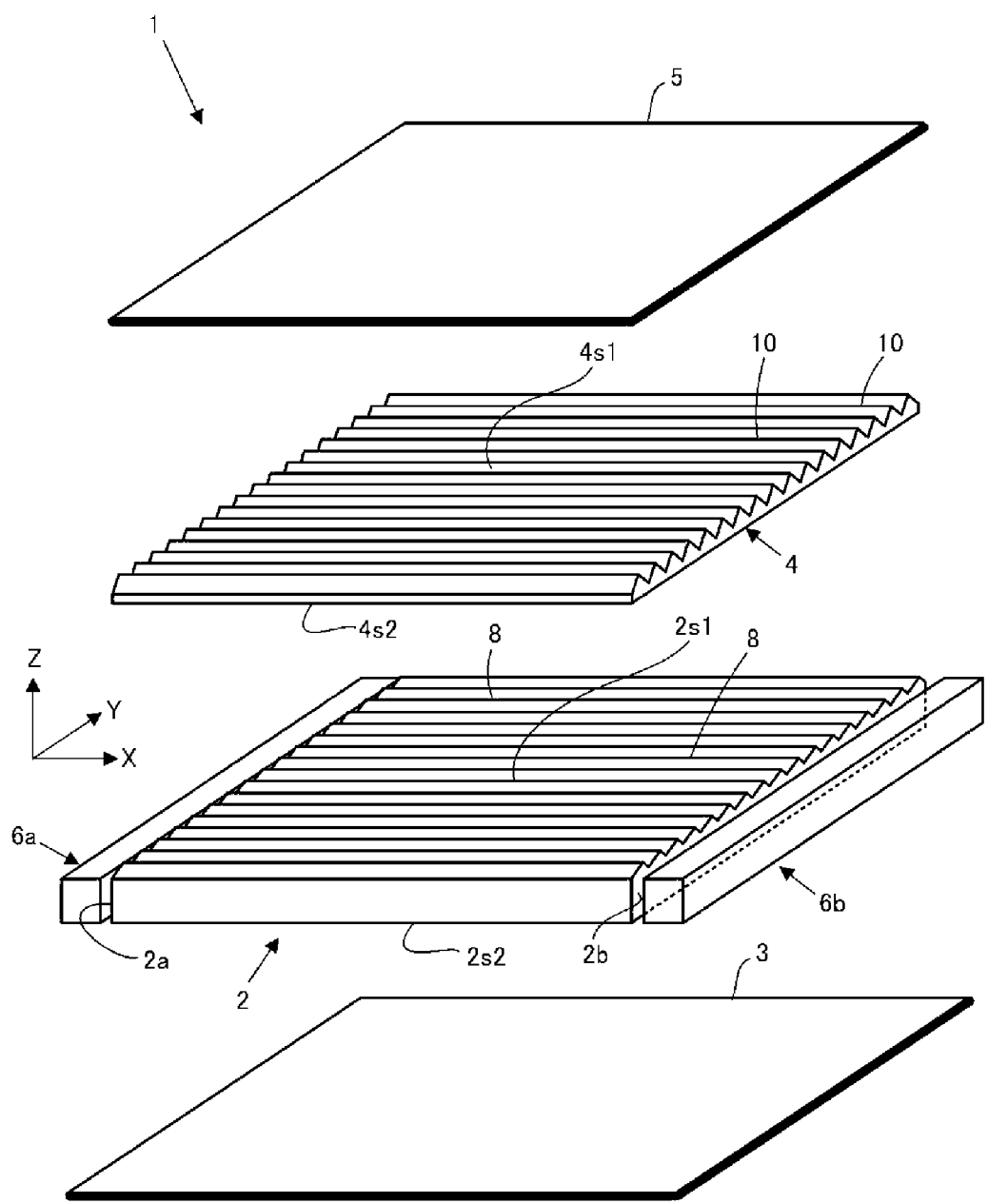
FIG. 1 is an exploded perspective view showing an exemplary embodiment of a surface light source device made in accordance with principles of the disclosed subject matter.
Figure 2:
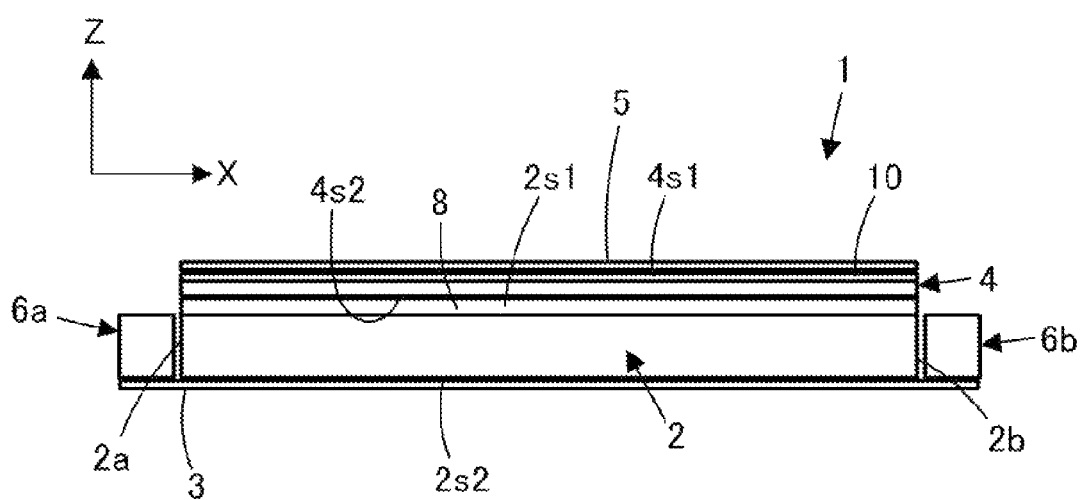
FIG. 2 is a front view showing an assembly of the exploded surface light source device of FIG. 1.

Exemplary embodiments of the disclosed subject matter will now be described in detail with reference to FIG. 1 to FIG. 14. FIG. 1 is an exploded perspective view showing an exemplary embodiment of a surface light source device made in accordance with principles of the disclosed subject matter, and FIG. 2 is a front view showing a assembly of the exploded surface light source device of FIG. 1.

The surface light source device 1 can include: a light guide 2 having a top surface 2s1, a bottom surface 2s2 and a pair of light incident surfaces 2a and 2b located between both ends of the top surface 2s1 and the bottom surface 2s2 and located on opposite surfaces with respect to each other; a reflective sheet 3 having a top surface located adjacent the bottom surface 2s2 of the light guide 2; a prism sheet 4 having a top surface 4s1 and a bottom surface 4s2 located adjacent the top surface 2s1 of the light guide 2; a diffusing sheet 5 having a top surface and a bottom surface located adjacent the top surface 4s1 of the prism sheet 4; and a pair of linear LED light sources 6a and 6b, each of the light source 6a and 6b located adjacent a respective one of the light incident surfaces 2a and 2b of the light guide 2.

The light guide 2 can be formed in a substantially tabular shape, and the top surface 2s1 and the bottom surface 2s2 of the light guide 2 can be formed in a substantially rectangular shape. The light guide 2 can be made of a transparent resin such as an acrylic resin, a polycarbonate resin, etc. In four side surfaces located between both ends of the top and the bottom surfaces of the light guide 2, a pair of opposite side surfaces can operate as the light incident surfaces 2a and 2b to receive light emitted from the pair of linear LED light sources 6a and 6b. Accordingly, a respective one of the light incident surfaces 2a and 2b can be located so as to face each of the linear LED light sources 6a and 6b.

Hereinafter, a direction perpendicular to the light incident surfaces 2a and 2b of the light guide 2 may be referred to as the X-axis direction, a longitudinal direction of the light incident surfaces 2a and 2b may be referred to as the Y-axis direction, and a direction perpendicular to the top surface 2s1 and the bottom surface 2s2 of the light guide 2 may be referred to as the Z-axis direction, as shown in FIG. 1.

Figure 3:
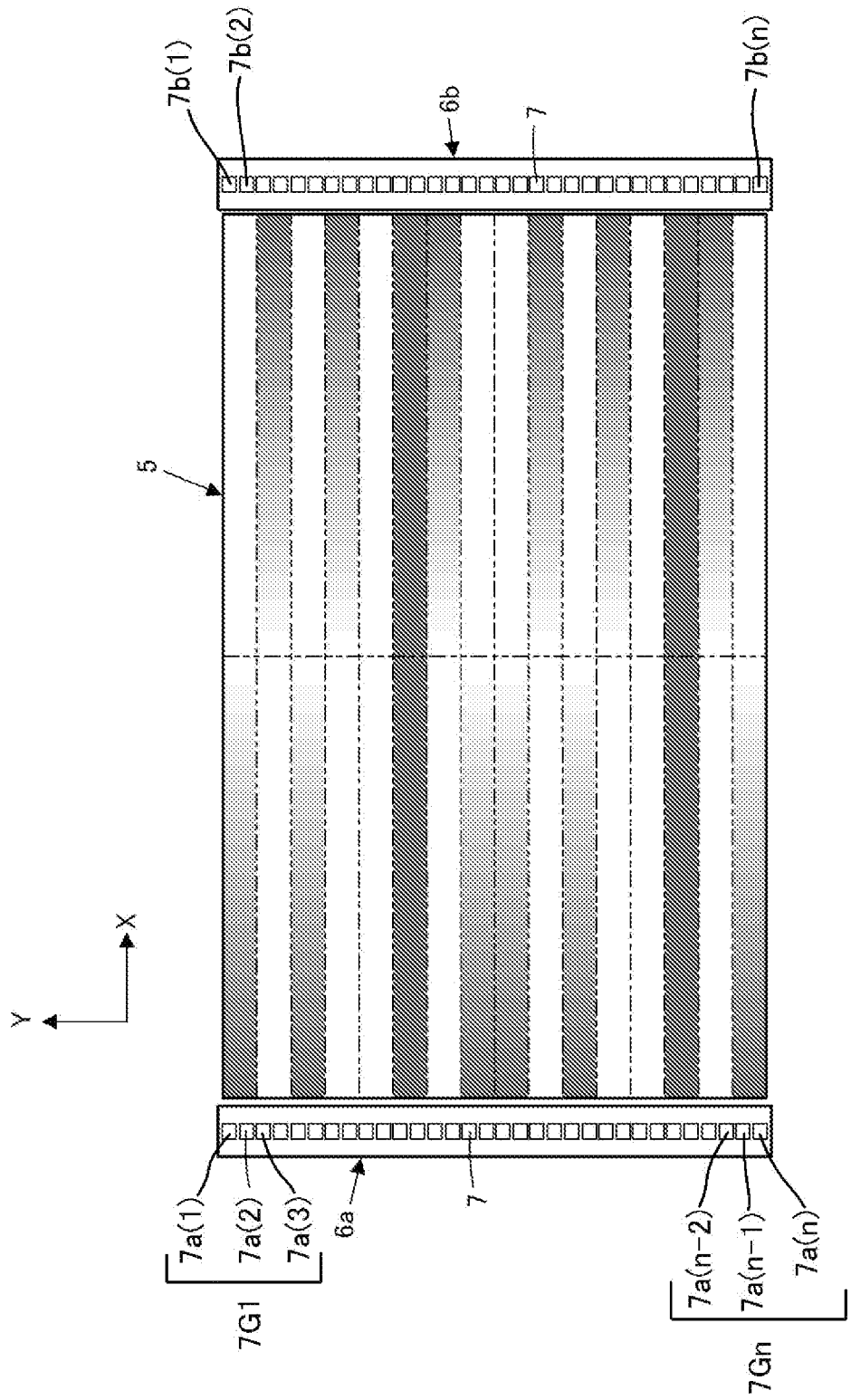
FIG. 3 is a top view showing the surface light source device of FIG. 2 in view of a top surface of a diffusing sheet.

FIG. 3 is a top view showing the surface light source device 1 when viewed from the top surface of the diffusing sheet 5. Each of the linear LED light sources 6a and 6b can be structured by arranging a plurality of LEDs 7, which are used as a point light source at a similar interval in both longitudinal directions of the linear LED light source 6a and 6b as shown in FIG. 3. Each of the LEDs 7 can be a white LED that emits substantially white light.

In this case, each of the LEDs 7 can include a blue light-emitting chip having a peak wavelength of 460 nanometers and a yellow phosphor such as YAG ($Y_3Al_5O_{12}:Ce^{3+}$), and also include a blue light-emitting chip having a peak wavelength of 460 nanometers, a red phosphor such as $CaAlSiN_3$:$Eu^{2+}$ and a green phosphor such as $Y_3(Ga, Al)_5O_{12}:Ce^{3+}$, in place of the yellow phosphor. Each of the LEDs 7 can employ an LED of InGaN series that emits near-ultraviolet light having a wavelength of approximately 380 nanometers, a laser diode having a narrow directivity that emits ultraviolet light, and the like in place of the blue light-emitting chip.

In this case, in order to emit substantially white light, each of the LEDs 7 can include: a red phosphor such as $CaAlSiN_3$:$Eu^{2+}$ wavelength-converting the ultraviolet light into red light; a green phosphor such as $(S1, A1)_6 (O, N):Eu^{2+}$ wavelength-converting the ultraviolet light into green light; and a blue phosphor such as $(Sr, Ca, Ba, Mg)_{10}(PO_4)_6Cl_2:Eu^{2+}$ wavelength-converting the ultraviolet light into blue light.

The LEDs 7 can be divided into a plurality of groups, such as 7G1 composed of three LEDs 7a(1) to 7a(3), 7G2 composed of two LEDs 7a(4) and 7a(5), 7G3 composed of one LED 7a(6), and the like, and the light intensity of each of these groups can be controlled in a stepwise fashion between extinction and full emission. Thereby, each of the linear LED light sources 6a and 6b can provide various light intensity distributions in the longitudinal direction of the respective one of the light incident surfaces 2a and 2b, which faces each of the linear LED light sources 6a and 6b.

For example, only one of the groups 7G1, 7G2 and 7G3 can be emitted, two of the groups 7G1, 7G2 and 7G3 can be emitted, and all of the groups 7G1, 7G2 and 7G3 can be emitted. Additionally, each of the light intensities of the groups 7G1, 7G2 and 7G3 can be also controlled in accordance with a display content on an LCD, which is located adjacent the top surface of the diffusing sheet 5 of the surface light source device 1. Similarly, the linear LED light source 6b that is composed of LEDs 7b(1), 7b(2) to 7b(n) can also be controlled by a method similar to the above-described driving method for the linear LED light source 6a.

Figure 4A:
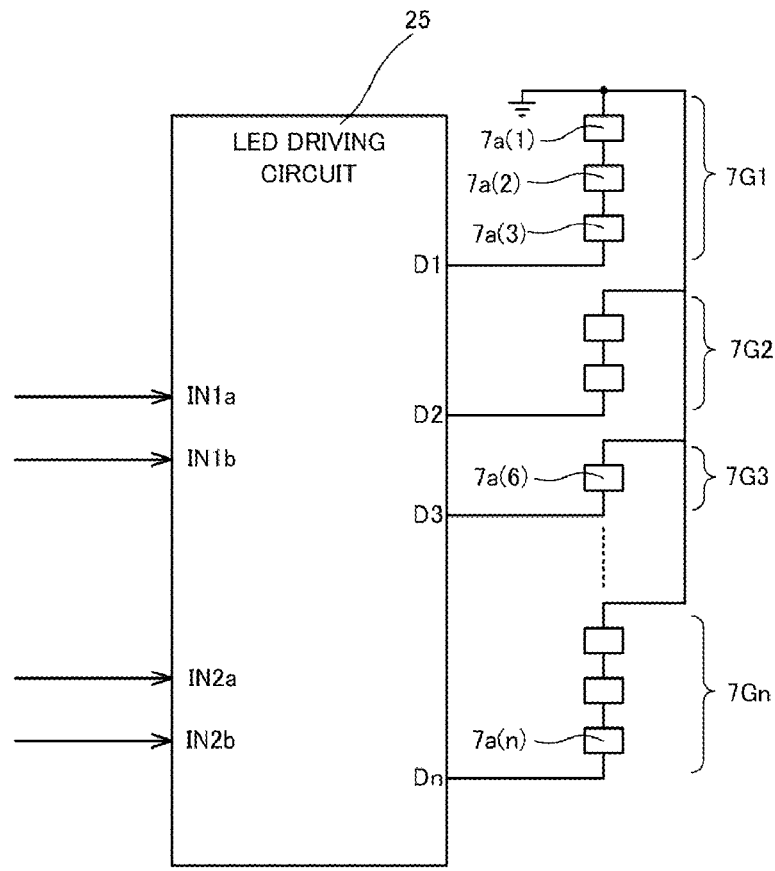
FIG. 4a is an exemplary block circuit diagram for driving a linear LED light source.

Exemplary specific driving methods for the linear LED light source 6a will now be described with reference to FIG. 4a, which is an exemplary block circuit diagram for driving the linear LED light source 6a. An LED driving circuit 25 can control each of the light intensities of the groups 7G1 to 7Gn of the LEDs 7 independently with respect to each other using driving signals output from driving terminals D1 to Dn. In this case, each of the light intensities of the groups 7G1 to 7Gn can be controlled by a static drive method, and can be also controlled by a duty cycle drive method. In addition, each of the light intensities of the groups 7G1 to 7Gn can be efficiently controlled by a time-sharing method.

In these cases, a selection signal for the groups 7G1 to 7Gn can be received from an input terminal IN1a, and also a light intensity signal for the groups 7G1 to 7Gn can be received from another terminal IN1b. Accordingly, each of the light intensities of the groups 7G1 to 7Gn can be controlled in accordance with the selection signal and the light intensity signal for the groups 7G1 to 7Gn, which are output from an external device such as a controller for controlling an LCD unit and the like as described later.

Exemplary specific driving methods for the linear LED light source 6a when the surface light source device 1 is associated with the LCD unit will now be described with reference to FIG. 4b. FIG. 4a is an exemplary block circuit diagram for driving an active matrix type liquid crystal display (LCD). On the display area of the active matrix type LCD 26, there are provided a plurality of pixels arranged in a matrix, a plurality of scanning lines for sequentially scanning the pixels row by row, and a plurality of data lines for providing data to be written onto the respective pixels (not shown in FIG. 4b).

Figure 4B:
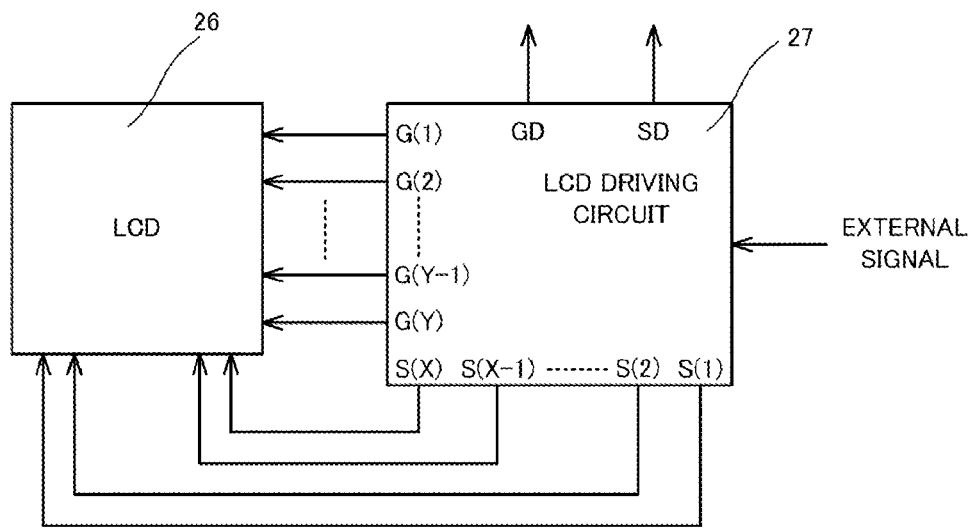
FIG. 4b is an exemplary block circuit diagram for driving an active matrix type liquid crystal display according to an exemplary embodiment of the disclosed subject matter.

Each of the scanning lines can be connected to a respective one of scanning terminals G(1) to G(y) in an LCD driving circuit 27, and also each of the data lines to a respective one of data terminals S(1) to S(x), as shown in FIG. 4b. The LCD driving circuit 27 can display the pixels by sequentially selecting the respective one of the scanning terminals G(1) to G(y) and by providing each of the data lines with the corresponding pixel data output from the respective one of the data terminals S(1) to S(x) every scanning line. The LCD driving circuit 27 can be controlled by an external signal output from the controller (not shown in FIG. 4b) for controlling the whole LCD unit including the LCD 26.

In this case, the LCD driving circuit 27 can output a scanning data to acknowledge a selected scanning line among the scanning terminals G(1) to G(y) from a scanning data terminal GD, and can output a pixel data corresponding to the respective one of the data terminals S(1) to S(x) every scanning line from a pixel data terminal SD. In addition, the LED driving circuit 25 can receive the scanning data output from the scanning data terminal GD therein via an input terminal IN2a, and also can receive the pixel data output from the pixel data terminal SD therein via another input terminal IN2b so that each of the light intensities of the groups 7G1 to 7Gn can be associated with the display content on the LCD 26, as shown in FIG. 4a.

Accordingly, the LED driving circuit 25 can cause each of the groups 7G1 to 7Gn to emit in synchronization with pixels in rows selected by each of the scanning lines connecting to the scanning terminals G(1) to G(y) in accordance with the scanning data output from the scanning data terminal GD of the LCD driving circuit 27. In addition, the LED driving circuit 25 can also control each of the light intensities of the groups 7G1 to 7Gn in synchronization with pixels in rows selected by each of the scanning lines connecting to the scanning terminals G(1) to G(y) in accordance with the pixel data output from the pixel data terminal SD of the LCD driving circuit 27.

For example, when the pixels in rows display a black color or a dark color similar to the black color, the group of the linear LED light source 6a corresponding to the pixels in rows can be turned off. The extinction of the group can result in a display having a high contrast in the LCD 26 and can also result in reducing power consumption due the extinction. On the display of the LCD 26, although an up and down portions may not change a lot, a middle portion of the display may change a lot in general.

Therefore, the groups 7G1 and 7Gn of the LEDs 7 that are located at both ends of the linear LED light source 6a can increase the number of LEDs included therein, and as the groups of the LED 7 approach toward a central group of the LEDs 7, the number of LEDs included in the groups can be reduced. Thereby, the LED driving circuit 25 can efficiently control each of the groups 7G1 to 7Gn of the LEDs 7 with a simple structure, and can provide the display having a high contrast while reducing power consumption.

In above-described driving method, the LCD driving circuit 27 outputs the signals for controlling each of the groups 7G1 to 7Gn to the LED driving circuit 25. However, the controller for controlling the LCD driving circuit 27 can also output the signals for controlling each of the groups 7G1 to 7Gn directly to the LED driving circuit 25. In addition, the driving method is described as an exemplary embodiment for driving the active matrix type LCD 26. However, the driving method can also be used for driving other type LCDs such as a segment type LCD, etc.

Figure 5:
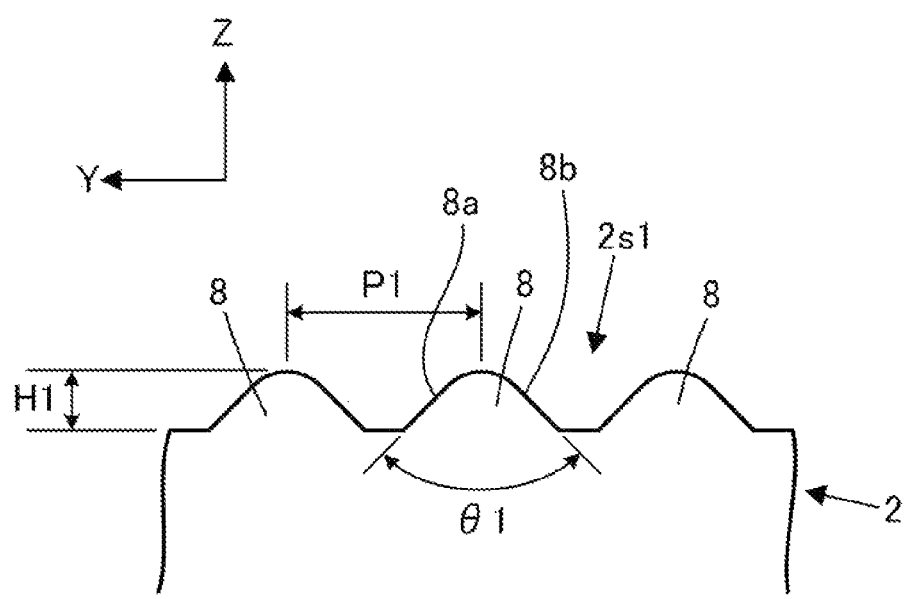
FIG. 5 is an enlarged close up view showing linear convexes formed on a top surface of a light guide according to an exemplary embodiment of the disclosed subject matter.

On the top surface 2s1 of the light guide 2, a plurality of linear convexes 8 can be formed as shown in FIG. 1. The plurality of linear convexes 8 formed on the top surface 2s1 can extend in the X-axis direction, and can be aligned in the Y-axis direction. Each cross-sectional shape of the linear convexes 8 can be similar to a triangle in view from the X-axis direction. In more detail, each cross-sectional shape of the linear convexes 8 can be formed, for example, in an isosceles triangle, in which an apex angle is rounded as shown in FIG. 5.

Therefore, each of both side surfaces 8a and 8b of the linear convexes 8 can become a slant surface, because each of widths in the Y-axis direction of the linear convexes 8 extends from the apex angle toward both basic angles. In other words, each of the side surfaces 8a and 8b of the linear convexes 8 can become a slant surface, in which each Y-axis component of normal vectors of both side surfaces 8a and 8b becomes opposite. Each slant angle of both side surfaces 8a and 8b can be substantially the same as each other.

Here, as a matter of convenience, each of the side surfaces 8a and 8b is depicted in an oversized shape in FIGS. 1 and 2. However, each of the side surfaces 8a and 8b can be a minim shape. As an exemplary shape, which is used for an exemplary embodiment of the surface light source device 1 described later, each pitch P1 of adjacent linear convexes 8 can be 29 micro meters, each height H1 of the linear convexes 8 can be 7.46 micro meters, and an angle between the both side surfaces 8a and 8b can be 90 degrees.

However, each pitch P1 can be between 10 and 70 micro meters, each height H1 can be between 1 and 40 micro meters, and the angle between the both side surfaces 8a and 8b can be between 80 and 130 degrees. In addition, each surface in the Y-axis direction between the adjacent linear convexes 8 becomes a flat surface perpendicular to the Z-axis as shown in FIG. 5. However, each of the surfaces in the Y-axis direction between the adjacent linear convexes 8 is not always need to be included on the top surface 2s1, and the linear convexes 8 can continuously align without the above surfaces.

Figure 6A:
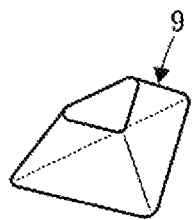
FIG. 6a is an enlarged perspective view showing one dot formed underneath a bottom surface of the light guide.
Figure 6B:
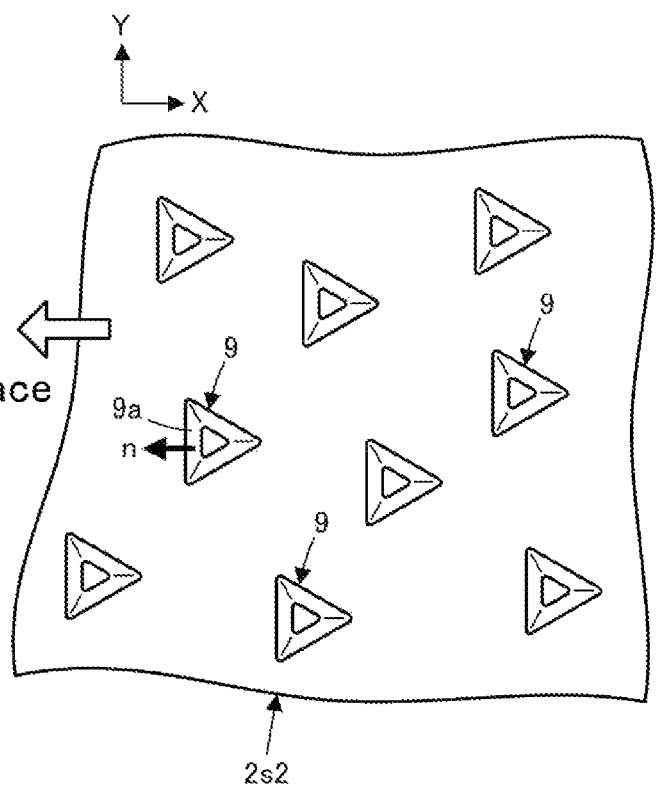
FIG. 6b is a partial enlarged rear view showing a locating state of dots formed underneath the bottom surface of the light guide according to an exemplary embodiment of the disclosed subject matter.

On the bottom surface 2s2 of the light guide 2, a plurality of dots 9 can be formed as shown in FIG. 6b. Each of the dots 9 projecting on the bottom surface 2s2 can be a minim convex of a triangle truncated cone, in more detail, the triangle truncated cone in which all nine sides are rounded as shown in FIG. 6a. Three bottom widths of each of the dots 9 can be between 30 and 500 micro meters, and each height of the dots 9 can be between 1 and 500 micro meters.

Here, when the bottom surface 2s2 of the light guide 2 is divided into two equal parts of a first bottom region located toward the light incident surface 2a and a second bottom region located toward the light incident surface 2b with respect to a central line of the bottom surface 2s2 of the light guide 2 in the X-axis direction, each direction of the dots 9 located on the first bottom region and each direction of the dots 9 located on the second bottom region can be substantially opposite with respect to the central line of the bottom surface 2s2 in the X-axis direction.

More specifically, with respect to each of the dots 9 that are located on the first bottom region of the bottom surface 2s2, a direction of a normal vector n of a first slant surface 9a among three slant surfaces of each of the dots 9 can be substantially the same as the X-axis direction, and also the first slant surface 9a can be located at a closer position to the light incident surface 2a than other two slant surfaces. Each of the dots 9 that are located on the second bottom region of the bottom surface 2s2 can be the same as the above-described structure of the dots 9 located on the first bottom region.

The plurality of linear convexes 8 that are formed on the top surface 2s1 of the light guide 2 and the plurality of dots 9 that are formed on the bottom surface 2s2 of the light guide 2 can be formed by a molding tool such as a stamper having molding surfaces corresponding to the top surface 2s1 and the bottom surface 2s2, and therefore can be integrated as the light guide 2 by the molding tool.

Returning to FIG. 1, the reflective sheet 3 can reflect light emitted from the bottom surface 2s2 in light entering into the light guide 2 from the light incident surfaces 2a and 2b, and can return the light emitted from the bottom surface 2s2 into the light guide 2. The reflective sheet 3 can be located adjacent the light guide 2 so as to cover the bottom surface 2s2 of the light guide 2 therewith as shown in FIG. 2, and can be made of a material having high reflectivity, such as polyethylene terephthalate (PET), etc.

The prism sheet 4 can direct light emitted from the top surface 2s1 of the light guide 2 in a front direction of the light guide 2 (the Z-axis direction), and therefore can be located adjacent the light guide 2 so as to cover the top surface 2s1 of the light guide 2 therewith as shown in FIG. 2. The bottom surface 4s2 of the prism sheet 4, which faces the top surface 2s1 of the light guide 2, can be formed in a substantially planar shape.

On the top surface 4s1 of the prism sheet 4, a plurality of triangular prisms 10 can be formed as shown in FIG. 1. The plurality of triangular prisms 10 formed on the top surface 4s1 can extend in the X-axis direction, and can be aligned in the Y-axis direction, in the same manner as the plurality of linear convexes 8 that are formed on the top surface 2s1 of the light guide 2.

The prism sheet 4 can be made as a multilayer by forming a resin, such as an acrylic resin on the PET, etc. Each cross-sectional shape of the triangular prisms 10 of the prism sheet 4 can be similar to a triangle in view from the X-axis direction, and can be similar to that of the linear convexes 8 formed on the top surface 2s1 of the light guide 2. Each pitch of adjacent triangular prisms 10 can be between 18 and 50 micro meters, each height of the triangular prisms 10 can be between 7 and 30 micro meters, and an angle between both side surfaces can be between 80 and 100 degrees.

As a supplementary explanation, in order to prevent the prism sheet 4 from adhering tightly to the top surface 2s1 of the light guide 2, each height H1 of the linear convexes 8 of the light guide 2 can vary, and a matting treatment can also be formed underneath the bottom surface 4s2 of the prism sheet 4. In addition, a sheet for preventing the prism sheet 4 from adhering tightly to the top surface 2s1 of the light guide 2, such as a diffusing sheet having low hazy characteristics can also be disposed between the light guide 2 and the prism sheet 4. Moreover, each pitch P1 of the adjacent linear convexes 8 and each pitch of the triangular prisms 10 of the prism sheet 4 can be set at different pitches with respect to each other, in order to avoid interference between the light guide 2 and the prism sheet 4.

The diffusing sheet 5 can diffuse light emitted from the light guide 2 via the prism sheet 4, and therefore can be located adjacent the top surface 4a1 of the prism sheet 4 so as to cover the triangle prisms 10 formed on the top surface 4a1 therewith, as shown in FIG. 2. The diffusing sheet 5 can be made by forming an acrylic bead layer on the PET.

An operation of an exemplary embodiment of the surface light source device 1 will now be described. For example, the LED driving circuit 25 can control each of the light intensities of the groups of the LEDs 7 in each of the linear LED light sources 6a and 6b, as described with reference to FIG. 4a.

In this case, each of the light beams emitted from the groups of the LEDs 7 can enter into the light guide 2 via each of the light incident surfaces 6a and 6b facing the groups of the LEDs 7. Light entering into the light guide 2 can be emitted directly from the top surface 2s1 of the light guide 2 or indirectly via the reflective sheet 3 after being emitted from the bottom surface 2s2 of the light guide 2. In this case, each of the dots 9 formed on the bottom surface 2s2 can operate to direct light beams that are directed toward the dots 9 in the light guide 2, toward the reflective sheet 3, and can operate to direct light, which is reflected on the reflective sheet 3, toward the top surface 2s1 of the light guide 2.

In addition, because the dots 9 are formed on the bottom surface 2s2 in the above-described direction, both light entering into the dots 9 that is located toward the light incident surface 2a on the bottom surface 2s2 from the light incident surface 2a of the light guide 2 and light entering into the dots 9 that is located toward the light incident surface 2b on the bottom surface 2s2 from the light incident surface 2b of the light guide 2 can be directed in the X-axis direction by each of the dots 9, and each of the dots 9 can prevent both light beams from diffusing in the Y-axis direction.

Moreover, the linear convexes 8 formed on the top surface 2s1 of the light guide 2 can operate to direct light emitted from the top surface 2s1, toward the Z-axis direction or toward a direction close to the Z-axis direction. Accordingly, the light emitted from the top surface 2s1 can be emitted in the Z-axis direction or in a direction close to the Z-axis direction.

As a result, when the top surface 2s1 of the light guide 2 is viewed from the X-axis direction, many of the light beams entering into the light guide 2 from the LEDs 7 can be guided in the X-axis direction or in the direction close to the X-axis direction, and can be emitted from the top surface 2s1 of the light guide 2. That is, the light entering into the light guide 2 from the LEDs 7 can move linearly in the X-axis direction or in the direction close to the X-axis direction and can be emitted from the top surface 2s1 of the light guide 2.

The light emitted from the top surface 2s1 of the light guide 2 can be emitted from the top surface of the diffusing sheet 5 via the prism sheet 4. In this case, the light emitted from the top surface 2s1 of the light guide 2 can be deflected in a Y-axis rotating direction with reference to the X-axis direction in the prism sheet 4 so as to be emitted from the top surface 4s1 of the prism sheet 4 in the Z-axis direction or in a direction close to the Z-axis direction. The light emitted from the prism sheet 4 can be emitted from the top surface of the diffusing sheet 5 as a surface light-emission of the surface light source device 1 after reasonably diffusing the light in the diffusing sheet 5.

The surface light source device 1 can provide the surface light-emission using the above-described operation. When the LCD is located adjacent the top surface of the diffusing sheet, the surface light-emission can be used as a surface light source for a back light unit of the LCD. In this case, when the light guide 2 is viewed from the Z-axis direction, because the light entering into the light guide 2 can move in the X-axis direction or in the direction close to the X-axis, the light entering into the light guide 2 from each of the groups of the LEDs 7 can be emitted from the top surface 2s1 of the light guide 2 while maintaining a constant width in the Y-axis direction.

Therefore, the light entering into the light guide 2 from each of the groups of the LEDs 7 can be emitted from a region having the constant width on the top surface 2s1 of the light guide 2, and the constant width may correspond to basically each width of the light incident surfaces 2a and 2b facing each of the groups of the LEDs 7.

Light emitted from the LEDs 7 of the linear LED light source 6a can enter into the light guide 2 from the light incident surface 2a, and can be mainly emitted from an approximately half region of the top surface 2s1 toward the light incident surface 2a. Similarly, because light emitted from the LEDs 7 of the linear LED light source 6b can enter into the light guide 2 from the light incident surface 2b, the light entering into the light guide 2 from the light incident surface 2b can be mainly emitted from an approximately half region of the top surface 2s1 toward the light incident surface 2b.

Accordingly, the exemplary surface light source device 1 can change each light emitted from the groups, which are included in each of the linear LED light sources 6a and 6b, into a respective one of lights emitted from local areas of the top surface 2s1 adjacent each of the groups, on a respective one of the half regions of the top surface 2s1 that are located adjacent each of the linear LED light sources 6a and 6b. Additionally, each of overlap light-emitting areas in adjacent local areas can be reduced due to the above-described light directivity.

Thus, the disclosed subject matter can provide surface light source devices having a local dimming function, in which each light emitted from the groups of the linear light source 6a and 6b can be emitted from a respective one of local areas of the top surface of the diffusing sheet 5 adjacent each of the groups on a respective one of half regions on the top surface of the diffusing sheet 5 by controlling each of the light intensities of the groups included in each of the linear LED light sources 6a and 6b.

For example, FIG. 3 shows the top surface of the diffusing sheet 5 in view from the Z-axis direction, when two adjacent LEDs among the LEDs 7 are on or off. White portions show light-emitting half regions due to light-emission of the adjacent two LEDs among the LEDs 7, and also dark portions show non-light-emitting half regions due to extinction of the two adjacent LEDs among the LEDs 7.

Results of verification in regard to optical characteristics of the embodiment of the surface light source device 1 will now be described with reference to FIGS. 7 to 13. In order to compare the optical characteristics of the embodiment of the surface light source device 1, a comparative embodiment having the following structure was used.

As a light guide of the comparative embodiment, a light guide having a planar top surface and a bottom surface including a plurality of circular dots is used, and a diffusing sheet is located between the light guide 2 and the prism sheet 4. Other structures of the comparative embodiment are the same as the exemplary embodiment.

Figure 7A:
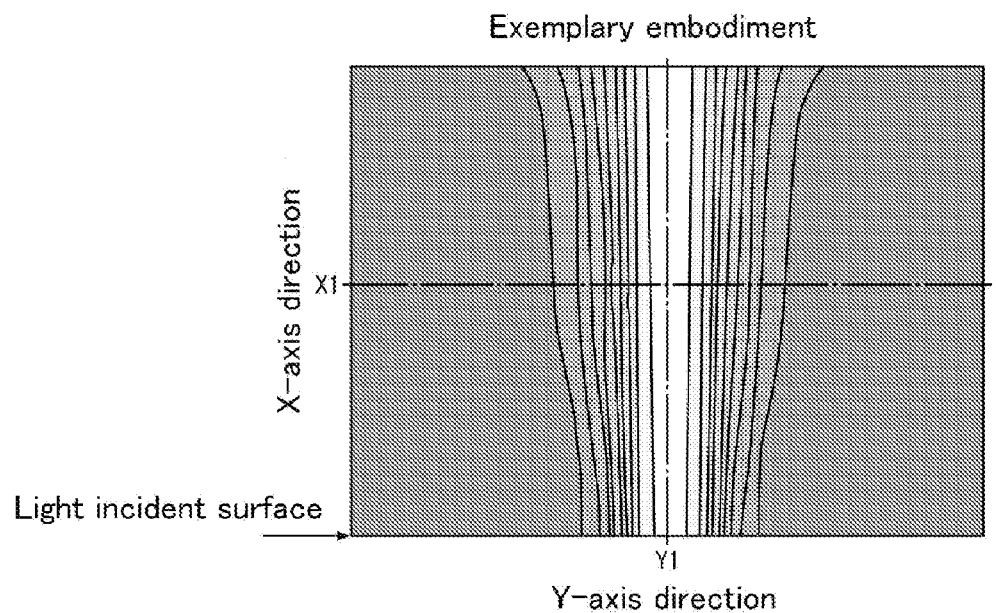
FIGS. 7a and 7b are diagrams showing a result of a first verification for measuring isophotes with reference to X-axis direction and Y-axis direction in view of each light-emitting surface in an exemplary embodiment and a comparative embodiment, respectively.
Figure 7B:
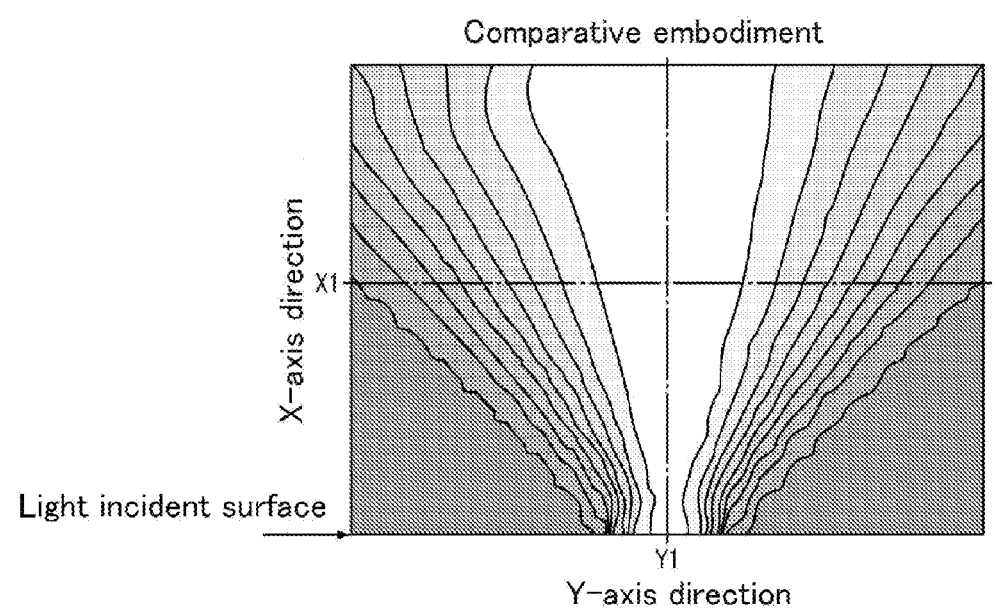

In a first verification, each of the light intensities of light-emitting surfaces (top surfaces of the diffusing sheet 5) in the exemplary embodiment and the comparative embodiment was measured while causing one of the groups of the LEDs 7 to emit. FIGS. 7a and 7b are diagrams showing a measuring result of isophotes with reference to the X-axis direction and the Y-axis direction in view of each light-emitting surface in the exemplary embodiment and the comparative embodiment, respectively.

In the comparative embodiment as shown in FIG. 7b, the farther the isophote is from the incident surface in the X-axis direction, the wider it becomes in the Y-axis direction. However, in the exemplary embodiment as shown in FIG. 7a, the isophote may extend in the X-axis direction while relatively maintaining substantially parallel with each other.

Figure 8:
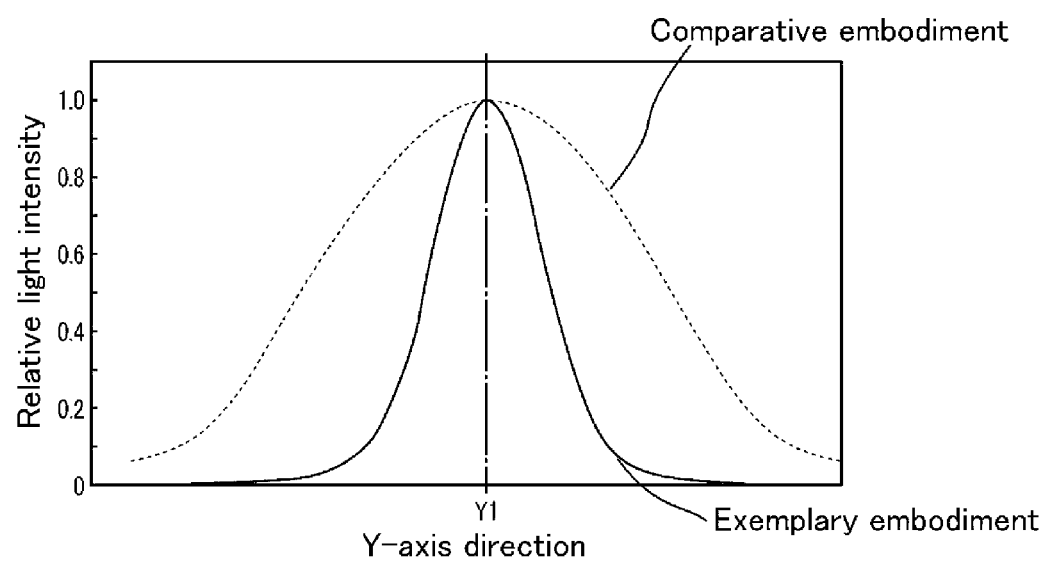
FIG. 8 is a graph showing relative light intensities in the Y-axis direction on lines X1 of FIGS. 7a and 7b in the exemplary embodiment and the comparative embodiment.

FIG. 8 is a graph showing relative light intensities in the Y-axis direction on lines X1 of FIGS. 7a and 7b in the exemplary embodiment and the comparative embodiment. In the comparative embodiment, the relative light intensity in the Y-axis direction shows a light distribution having a wide bottom width, and diffuses with a wide range. However, because the relative intensity in the exemplary embodiment may not diffuse widely in the Y-axis direction, light having a high linearity may move in the X-axis direction and may be emitted from the top surface of the diffusing sheet 5 so as not to widely expand in the Y-axis direction.

Figure 9A:
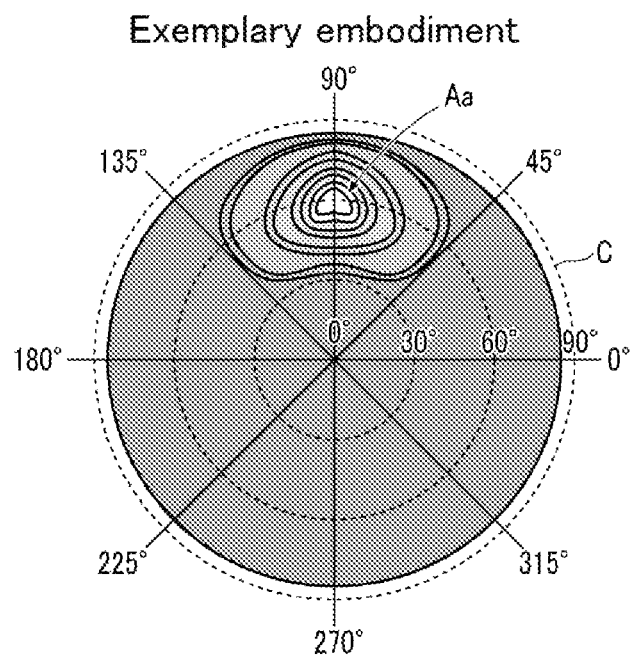
FIGS. 9a and 9b are diagrams showing a result of a second verification for measuring isophotes with respect to an angle of rotational direction in Z-axis direction in view from each top surface of light guides in the exemplary embodiment and the comparative embodiment, respectively.
Figure 9B:
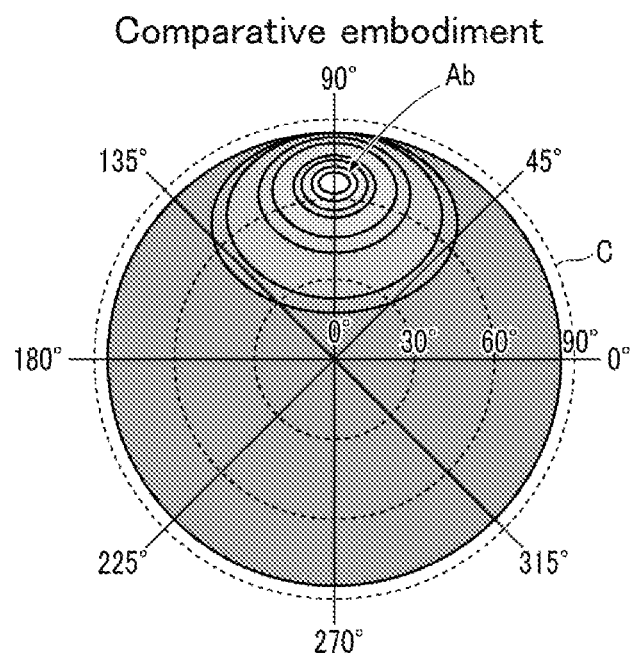

In a second verification, each of the light intensities of lights emitted from the top surfaces 2s1 of the light guides 2 without the prism sheets 4 and the diffusing sheets 5 in the exemplary embodiment and the comparative embodiment was measured when the one of the groups of the LEDs 7 was emitted. FIGS. 9a and 9b are diagrams showing a result of the second verification for measuring isophotes with respect to an angle of rotational direction in the Z-axis direction in view from each top surface 2s1 of the light guides 2 in the exemplary embodiment and the comparative embodiment, respectively.

In FIGS. 9a and 9b, the X-axis direction is a line connecting between 90 degrees and 270 degrees, and the Y-axis direction is a line connecting between 0 degrees and 180 degrees. The angle of rotational direction in the Z-axis direction is from a center (0 degrees) of a circle C toward a circumference of the circle C, in which 0 degrees of the center shows the Z-axis direction perpendicular to the X-axis and the Y-axis directions, and the circumference of 90 degrees shows a plane connecting the X-axis direction to the Y-axis direction. Mark Aa of FIG. 9a shows the isophotes in the exemplary embodiment, and also mark Ab of FIG. 9b shows the isophotes in the comparative embodiment.

Although an angle of direction that shows a maximum light intensity in the comparative embodiment is the substantially same as that in the exemplary embodiment, as the light intensity reduces, intervals between the isophotes tend to extend as shown in FIG. 9b. However, intervals between the isophotes in a light-emitting area having a relatively high light intensity in the exemplary embodiment may maintain at narrow intervals as compared with the comparative embodiment as shown in FIG. 9a. Accordingly, the exemplary embodiment can emit light having a relatively narrow directivity in the Z-axis direction as compared with the comparative embodiment, although the light having a narrow directivity in the Z-axis direction may slant toward the X-axis direction of 90 degrees.

Figure 10:
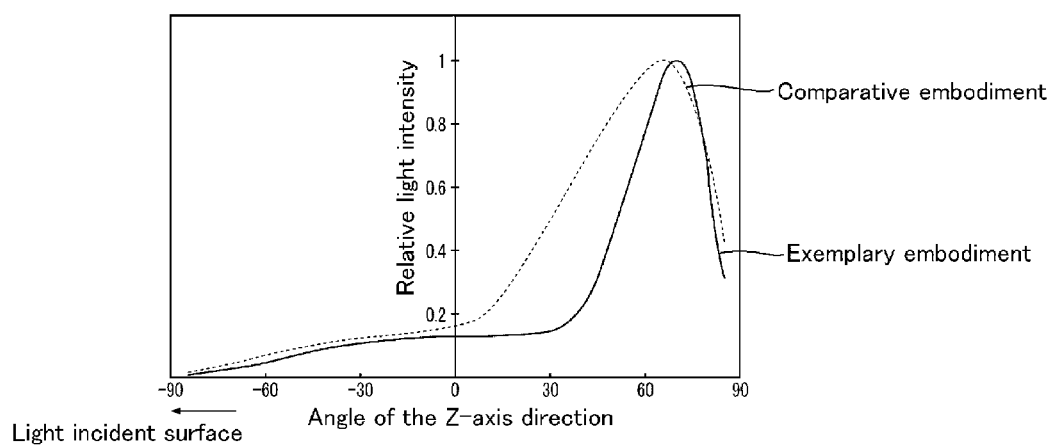
FIG. 10 is a diagram showing relations between an angle of the Z-axis direction and a relative light intensity with reference to the X-axis direction of FIGS. 9a and 9b in the exemplary embodiment and the comparative embodiment.

FIG. 10 is a diagram showing relations between an angle of the Z-axis direction and a relative light intensity with respect to the X-axis direction of 90 degrees of FIGS. 9a and 9b in the exemplary embodiment and the comparative embodiment. A light-emitting angle in the Z-axis direction in the comparative embodiment may become relatively wide, and therefore a light-emitting direction of the comparative embodiment may be easy to be out of alignment.

On the other hand, a light-emitting angle of light having a relatively high light intensity in the Z-axis direction of the exemplary embodiment can become relatively narrow. For example, the light-emitting angle of light having a relative light intensity of 0.5 or more may be between 50 and 80 degrees in the exemplary embodiment. However, the light-emitting angle of light having a relative light intensity of 0.5 or more may be between 30 and 80 degrees in the comparative embodiment. Therefore, the exemplary embodiment can emit light having a relatively high directivity as compared with the comparative embodiment.

Figure 11A:
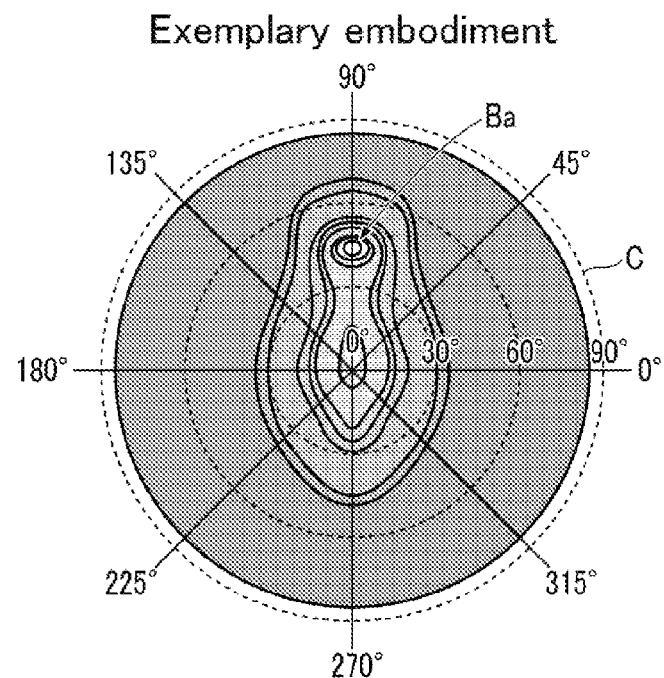
FIGS. 11a and 11b are diagrams showing a result of a third verification for measuring isophotes with respect to an angle of rotational direction in the Z-axis direction in view from each top surface of diffusing sheets in the exemplary embodiment and the comparative embodiment, respectively.
Figure 11B:
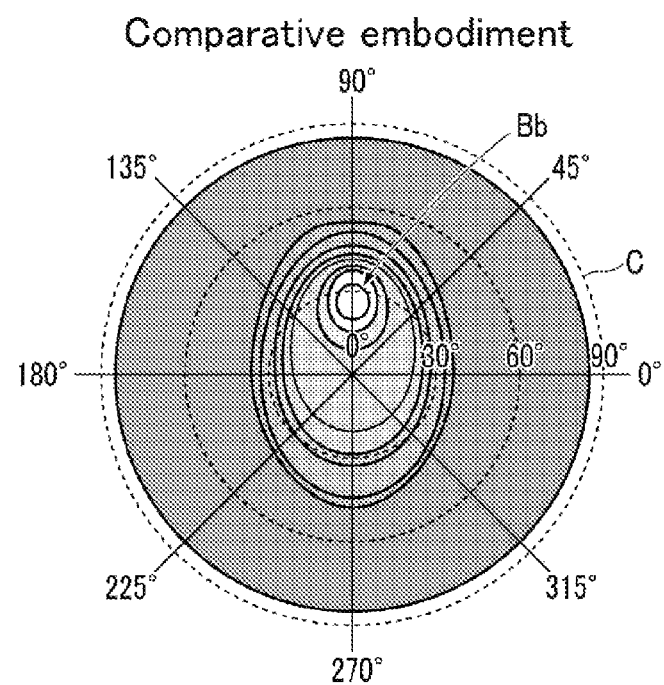

In a third verification, each of light intensities of lights emitted from the top surfaces of the diffusing sheets 5 in the exemplary embodiment and the comparative embodiment was measured while emitting one of the groups of the LEDs 7. FIGS. 11a and 11b are diagrams showing a result of the third verification for measuring isophotes with respect to an angle of rotational direction in the Z-axis direction in view from each top surface of the diffusing sheets 5 in the exemplary embodiment and the comparative embodiment, respectively.

Mark Ba shown in FIG. 11a shows the isophotes in the exemplary embodiment, and also mark Bb of FIG. 11b shows the isophotes in the comparative embodiment. Each of light intensities of lights having a maximum light intensity in the exemplary embodiment and the comparative embodiment can approach toward the center of 0 degrees that is the Z-axis direction, by locating the prism sheet 4 and the diffusing sheet 5 on the light guide 2 as compared with FIGS. 9a and 9b, in which the prism sheet 4 and the diffusing sheet 5 are not located on the light guide 2. In addition, the isophotes Ba in the exemplary embodiment can provide a relatively narrow directivity in the X-axis direction connecting 90 degrees to 270 degrees as compared with the isophotes Bb in the comparative embodiment.

Figure 12:
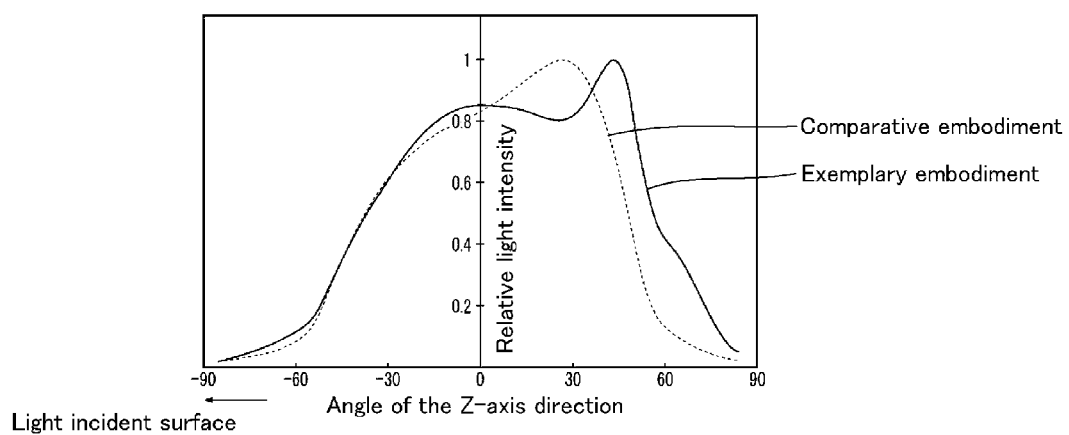
FIG. 12 is a diagram showing relations between an angle of the Z-axis direction and a relative light intensity with reference to the X-axis direction of FIGS. 11a and 11b in the exemplary embodiment and the comparative embodiment.

FIG. 12 is a diagram showing relations between an angle of the Z-axis direction and a relative light intensity with reference to the X-axis direction of FIGS. 11a and 11b in the exemplary embodiment and the comparative embodiment. The light-emitting angle of light having a relative light intensity of 0.5 or more may be approximately between −35 and 55 degrees in the exemplary embodiment. However, the light-emitting angle of light having a relative light intensity of 0.5 or more may be approximately between −35 and 45 degrees in the comparative embodiment. Therefore, the exemplary embodiment can emit light having a relatively high directivity in the X-axis direction and a relatively wide range in the Z-axis direction as compared with the comparative embodiment.

Figure 13:
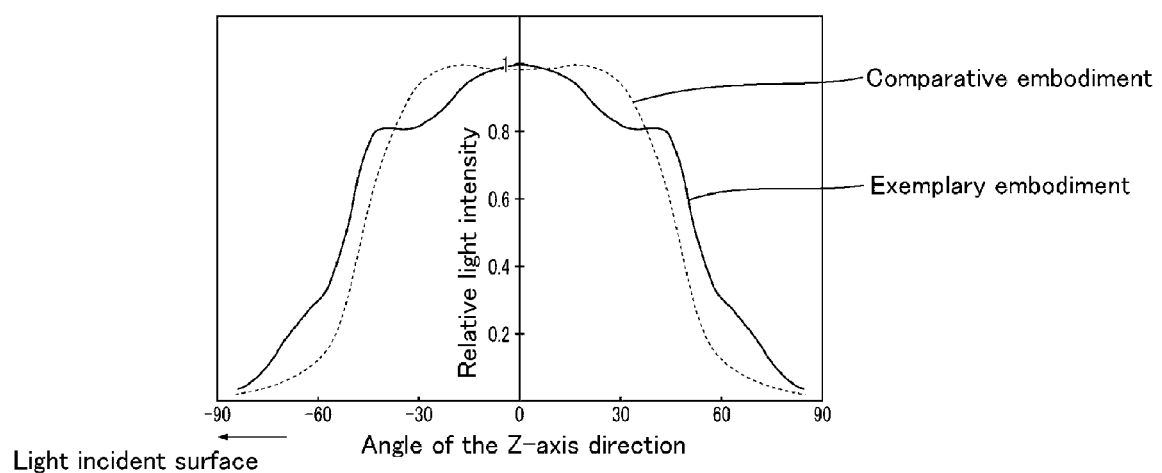
FIG. 13 is a diagram showing a result of a forth verification for measuring relations between an angle of the Z-axis direction and a relative light intensity with reference to the X-axis direction when each one of the LEDs of a pair of linear light sources emits light so as to face with respect to each other via the light guide in each of the exemplary embodiment and the comparative embodiment.

In a forth verification, each of the light intensities of light emitted from the top surfaces of the diffusing sheets 5 in the exemplary embodiment and the comparative embodiment was measured while causing emission of light from each one of the groups of the LEDs 7 in each of the linear LED light sources 6a and 6b so that each one faces with respect to each other via the light guide 2. FIG. 13 is a diagram showing a result of the forth verification for measuring relations between an angle of the Z-axis direction and a relative light intensity with reference to the X-axis direction in each of the exemplary embodiment and the comparative embodiment.

Each angle of the Z-axis directions of light having a maximum light intensity emitted from the exemplary embodiment and the comparative embodiment can become substantially 0 degrees, that is the substantially Z-axis direction. A light-emitting angle of light having a relatively high light intensity in the Z-axis direction of the exemplary embodiment can become relatively wide as compared with the comparative embodiment.

For example, the light-emitting angle of light having a relative light intensity of 0.5 or more may be approximately between −45 and 45 degrees in the comparative embodiment. However, the light-emitting angle of light having a relative light intensity of 0.5 or more may be approximately between −55 and 55 degrees in the exemplary embodiment. Therefore, the exemplary embodiment can emit light having a relatively wide range in the Z-axis direction as compared with the comparative embodiment.

As described above, the disclosed subject matter can provide surface light source devices having a local dimming function with a simple structure, by locating the light guide 2 between the prism sheet 4 locating the diffusing sheet 5 thereon and the reflective sheet 3 and by locating each of the linear LED light sources 6a and 6b so as to face the respective one of the light incident surfaces 2a and 2b of the light guide 2. Additionally, a light distribution for the local dimming function can be viewable at wider angles than a conventional surface light source, especially in the Z-axis direction.

Figure 14A:
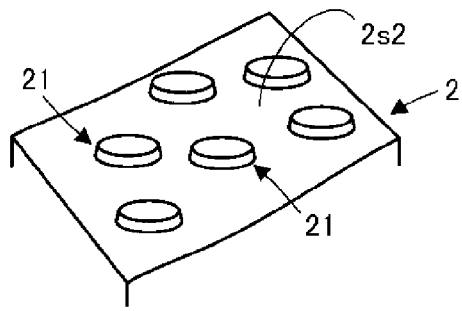
FIGS. 14a to 14c are partial enlarged perspective rear views showing exemplary variations for dots formed underneath the bottom surface of the light guide.
Figure 14B:
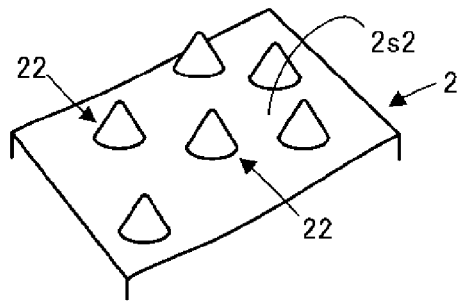
Figure 14C:
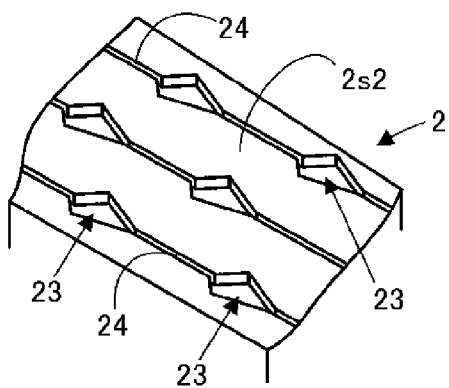
Figure 15A:
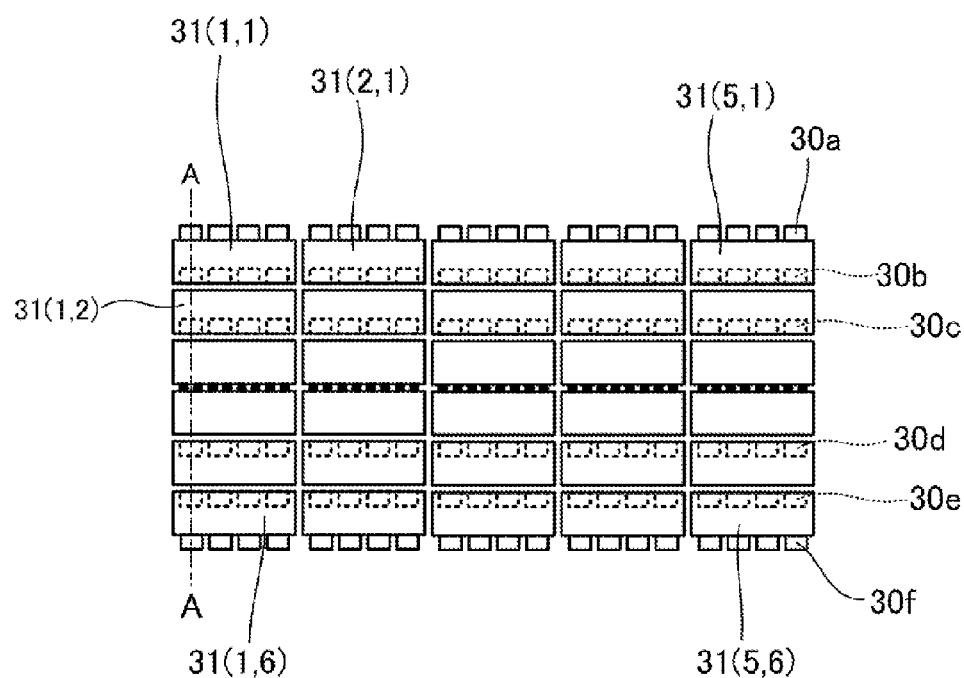
FIG. 15a is a schematic top view depicting a basic structure for a first conventional surface light source device.
Figure 15B:
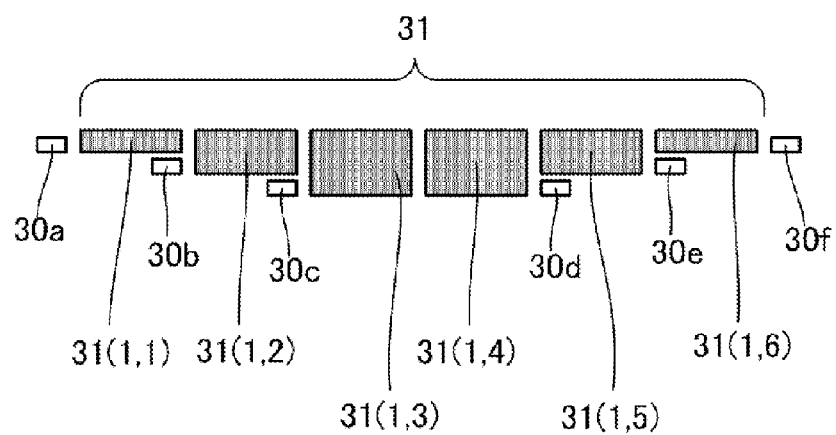
Figure 16:
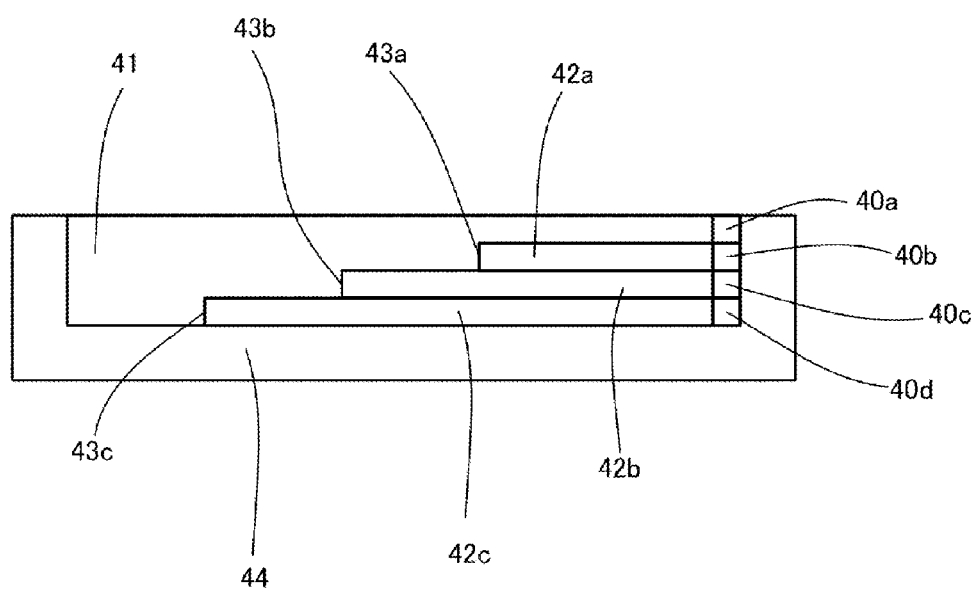
FIG. 16 is a schematic cross-sectional view depicting a basic structure for a second conventional surface light source device.

A case where the shape of each of the dots 9 is the minim convex of the triangle truncated cone is described. However, various shapes can be used for the dots 9. A minim concave of the triangle truncated cone can be formed underneath the bottom surface 2s2 of the light guide 2. Minim convexes (or minim concaves) of a circular truncated cone 21 can be formed underneath the bottom surface 2s2 of the light guide 2 as shown in FIG. 14a, and also minim convexes (or minim concaves) of a circular cone 22 can be formed underneath the bottom surface 2s2 of the light guide 2 as shown in FIG. 14b.

In addition, a plurality of substantially argyle concaves 23 can be formed underneath the bottom surface 2s2 of the light guide 2 so that the argyle concaves 23 are aligned in a direction perpendicular to the light incident surfaces 2a and 2b and are connected by a plurality of linear channels 24. A plurality of substantially argyle convexes can also be formed underneath the bottom surface 2s2 of the light guide 2 so that the argyle convexes are aligned in a direction perpendicular to the light incident surfaces 2a and 2b and are connected by a plurality of linear ridges.

The surface light source device 1 of the exemplary embodiments can be configured for use as a light source of a back light unit in an LCD unit for use in a television, a personal computer, display devices, mobile devices, etc. In these cases, the LCD unit can be configured to locate the surface light source device 1 in the rear of an LCD panel as described above.

However, these surface light source devices can also be configured for use as other light sources, such as for flat lighting and the like, without departing from the spirit and scope of the presently disclosed subject matter.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. A surface light source device, comprising:
a light guide having a top surface, a bottom surface and a pair of light incident surfaces located between both ends of the top surface and the bottom surface and located on opposite surfaces with respect to each other, the light guide including a transparent resin and formed in a substantially tabular shape, the top surface and the bottom surface of the light guide formed in a substantially rectangular shape and being substantially perpendicular to the light incident surfaces, the top surface of the light guide including a plurality of linear convexes that extend in a direction substantially perpendicular to the light incident surfaces and are aligned along a length substantially parallel to the light incident surfaces at a prescribed interval, each of the linear convexes formed in a substantially triangular cross-sectional shape in an aligned direction of the linear convexes, the bottom surface having an imaginary central line divided into two equal parts located between the pair of light incident surfaces, and including a plurality of dots formed in at least one of a minim convex shape and a minim concave shape, wherein the at least one of the minim convex shape and the minim concave shape included in the bottom surface of the light guide is formed as a substantially triangle truncated cone having a direction of a normal vector of a slant surface, wherein the direction of the normal vector of the slant surface is located in a direction substantially perpendicular to one of the light incident surfaces that is closer to the slant surface of the plurality of dots, and an imaginary extended surface of the slant surface enlarges toward the one of the light incident surfaces and also intersects with the direction of the normal vector of the slant surface at an acute angle toward the one of the light incident surfaces, and each of the pair of light incident surfaces formed in a substantially planar shape, wherein each direction of the plurality of dots located on one of the two equal parts and each direction of the plurality of dots located on another one of the two equal parts are substantially opposite with respect to the imaginary central line in a direction between the pair of light incident surfaces;

a pair of linear LED light sources each having a longitudinal direction and including a plurality of LEDs in each longitudinal direction, each of the linear light sources located adjacent a respective one of the pair of light incident surfaces of the light guide and facing the respective one of the light incident surfaces, the plurality of LEDs included in each of the linear LED light sources being divided into a plurality of groups, and each of the groups included in each of the linear LED light sources configured to emit light into the light guide independently with respect to each of the other groups via the respective one of the light incident surfaces facing each of the linear light sources, wherein each of the groups included in one of the pair of linear LED light sources faces a respective one of the groups included in another of the pair of linear LED light sources with respect to each other via the light guide;

an LED driving circuit configured to control light intensity of light emitted from each of the groups included in the linear LED light sources;

a reflective sheet having a top surface located adjacent the bottom surface of the light guide;

a prism sheet having a top surface and a bottom surface located adjacent the top surface of the light guide, the prism sheet including a transparent resin and formed in a substantially sheet shape, the top surface of the prism sheet including a plurality of triangular prisms that extend in the direction substantially perpendicular to the light incident surfaces of the light guide and are aligned along a length substantially parallel to the light incident surfaces of the light guide at a different interval from the prescribed interval of the plurality of linear convexes of the top surface of the light guide, each of the triangular prisms formed in a substantially triangular cross-sectional shape, and the bottom surface of the prism sheet formed in a substantially planar shape; and a diffusing sheet having a top surface and a bottom surface located adjacent the top surface of the prism sheet, the prism sheet including a transparent resin and formed in a substantially sheet shape.

2. The surface light source device according to claim 1, wherein the number of LEDs included in each of the groups of the linear LED light sources becomes reduced from each of both end groups of the linear LED light sources toward a group located at a central portion of a respective one of the linear LED light sources including both end groups.

3. The surface light source device according to claim 1, wherein each of the plurality of LEDs includes a blue light-emitting chip and a wavelength converting layer including at least one phosphor, the phosphor being selected from the group consisting of a yellow phosphor, and two phosphors including a red phosphor and a green phosphor.

4. The surface light source device according to claim 1, wherein each of the plurality of LEDs includes an ultraviolet light-emitting chip and a wavelength converting layer including at least one phosphor, the phosphor including at least one of a red phosphor, a green phosphor, and a blue phosphor.

5. The surface light source device according to claim 1, further comprising;

an LED driving circuit configured to control light intensity of light emitted from each of the groups included in the linear LED light sources.

6. An LCD unit including the surface light source device according to claim 5, further comprising: an LCD located adjacent the top surface of the diffusing sheet;

an LCD driving circuit configured to drive the LCD; and a controller configured to control the LCD driving circuit, wherein at least one of the LCD driving circuit and the controller is configured to provide the LED driving circuit with a signal to control light intensity of light emitted from each of the groups included in the linear LED light sources.

7. An LCD unit including the surface light source device according to claim 5, comprising:

an active matrix type LCD having a plurality of pixels arranged in a matrix, and including a plurality of scanning lines for sequencing the pixels row by row and a plurality of data lines for providing data to be written onto respective pixels, the active matrix type LCD located adjacent the top surface of the diffusing sheet so that the pixels in rows are substantially perpendicular to the light incident surfaces;

an LCD driving circuit configured to display the plurality of pixels via the scanning lines and the data lines; and a controller configured to control the LCD driving circuit, wherein at least one of the LCD driving circuit and the controller is configured to provide the LED driving circuit with a signal to control light intensity of light emitted from each of the groups included in the linear LED light sources in accordance with the data to be written onto the respective pixels.

8. The LCD unit according to claim 7, wherein the number of LEDs included in each of the groups of the linear LED light sources becomes reduced from each of both end groups of the linear LED light sources toward a group located at a central portion of a respective one of the linear LED light sources including both end groups.

9. An LCD unit including the surface light source device according to claim 1, further comprising: an LCD located adjacent the top surface of the diffusing sheet.

10. A surface light source device, comprising:

a light guide having a top surface, a bottom surface and a pair of light incident surfaces located between both ends of the top surface and the bottom surface and located on opposite surfaces with respect to each other, the light guide including a transparent resin and formed in a substantially tabular shape, the top surface and the bottom surface of the light guide formed in a substantially rectangular shape and being substantially perpendicular to the light incident surfaces, the top surface of the light guide including a plurality of linear convexes that extend in a direction substantially perpendicular to the light incident surfaces and are aligned along a length substantially parallel to the light incident surfaces at a prescribed interval, each of the linear convexes formed in a substantially triangular cross-sectional shape in an aligned direction of the linear convexes, the bottom surface including a plurality of dots formed in at least one of a minim convex shape and a minim concave shape, and each of the pair of light incident surfaces formed in a substantially planar shape;

a pair of linear LED light sources each having a longitudinal direction and including a plurality of LEDs in each longitudinal direction, each of the linear light sources located adjacent a respective one of the pair of light incident surfaces of the light guide and facing the respective one of the light incident surfaces, the plurality of LEDs included in each of the linear LED light sources being divided into a plurality of groups, and each of the groups included in each of the linear LED light sources configured to emit light into the light guide independently with respect to each of the other groups via the respective one of the light incident surfaces facing each of the linear light sources;

a reflective sheet having a top surface located adjacent the bottom surface of the light guide;

a prism sheet having a top surface and a bottom surface located adjacent the top surface of the light guide, the prism sheet including a transparent resin and formed in a substantially sheet shape, the top surface of the prism sheet including a plurality of triangular prisms that extend in the direction substantially perpendicular to the light incident surfaces of the light guide and are aligned along a length substantially parallel to the light incident surfaces of the light guide at a different interval from the prescribed interval of the plurality of linear convexes of the top surface of the light guide, each of the triangular prisms formed in a substantially triangular cross-sectional shape, and the bottom surface of the prism sheet formed in a substantially planar shape; and a diffusing sheet having a top surface and a bottom surface located adjacent the top surface of the prism sheet, the prism sheet including a transparent resin and formed in a substantially sheet shape; and wherein the at least one of the minim convex shape and the minim concave shape included in the bottom surface of the light guide is formed as a substantially triangle truncated cone having a direction of a normal vector of a slant surface, wherein the direction of the normal vector of the slant surface is located in a direction substantially perpendicular to one of the light incident surfaces that is closer to the slant surface of the at least one of the minim convex shape and the minim concave shape, and the slant surface enlarges toward the one of the light incident surfaces.

11. The surface light source device according to claim 10, wherein the number of LEDs included in each of the groups of the linear LED light sources becomes reduced from each of both end groups of the linear LED light sources toward a group located at a central portion of a respective one of the linear LED light sources including both end groups.

12. The surface light source device according to claim 10, wherein each of the plurality of LEDs includes a blue light-emitting chip and a wavelength converting layer including at least one phosphor, the phosphor being selected from the group consisting of a yellow phosphor, and two phosphors including a red phosphor and a green phosphor.

13. The surface light source device according to claim 10, wherein each of the plurality of LEDs includes an ultraviolet light-emitting chip and a wavelength converting layer including at least one phosphor, the phosphor including at least one of a red phosphor, a green phosphor, and a blue phosphor.

14. An LCD unit including the surface light source device according to claim 10, further comprising: an LCD located adjacent the top surface of the diffusing sheet.

* * * * *